Figure 1:
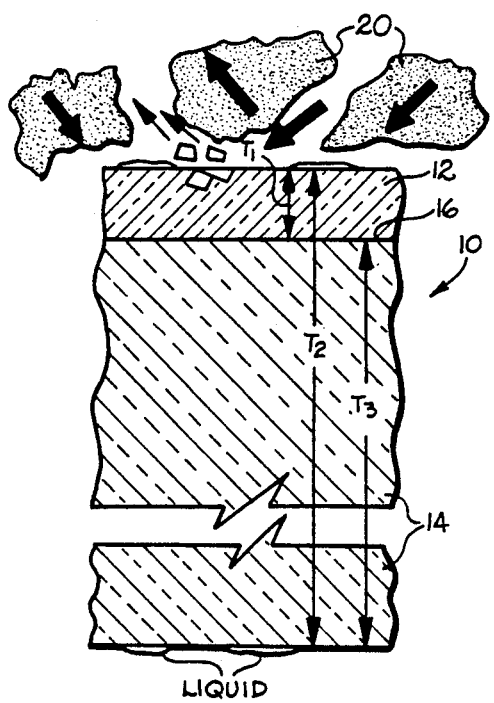

United States Patent [19]
Schoenhard

[11] Patent Number: 5,162,383
[45] Date of Patent: Nov. 10, 1992

[54] ABRASIVE PROCESS FOR POLYMER RECOVERY

[76] Inventor: James D. Schoenhard, 542 Circle Dr., Pleasant Plains, Ill. 62677

[21] Appl. No.: 748,001

[22] Filed: Aug. 21, 1991

[51] Int. Cl.$^5$ .............................................. B07B 7/00
[52] U.S. Cl. ................... 521/48; 521/48.5; 521/46; 521/46.5; 521/40
[58] Field of Search ............... 521/48, 48.5, 46, 46.5, 521/40

[56] References Cited

U.S. PATENT DOCUMENTS 4,775,697 10/1988 Schoenhard ........................ 521/48

OTHER PUBLICATIONS

"Encyclopedia of Polymer Science and Technology".

Primary Examiner—Paul R. Michl
Assistant Examiner—Olga Asinovsky
Attorney, Agent, or Firm—Willian Brinks Olds Hofer Gilson & Lione

[57] ABSTRACT

Pure polymer, such as polyester used in photographic film and in plastic walls of drink bottles or polycarbonate used in high-quality plastic beverage bottles, is separated from thin saran, metal, and other coating layers of a multi-layer film or sheet when the film sheet is wet, as from silver recovery and like processes. The coating layer is typically ½% or less of the total sheet or film thickness. The abrasion process in one form comprises rotating and mixing a volume of wet plastic chips of said film or sheet with about three to five volumes of hot (160 to 300 degrees F) small, hard abrasive particles such as quartzite aggregate, glass cullet, or the like, for a time sufficient to dry the chips and also to abrade the thin coating layer from the film or sheet. The abrasive particles and the coating dust are separated from the pure polymer by screens or air classifiers. The resulting polymer chips are clean and dry and are immediately available for pelletizing and reuse.

2 Claims, 1 Drawing Sheet

ABRASIVE PROCESS FOR POLYMER RECOVERY

BACKGROUND OF THE INVENTION

The present invention relates to apparatus and methods for separating and recovering valuable raw materials. It particularly relates to processes for recovering polymer such as polyester and polycarbonate plastics from multi-layer sheets and films where such polymer has a thin coating of saran, metal, and/or other substance thereon to improve the gas permeation resistance, toughness, or other characteristics or to provide an emulsion coating as in photographic film.

My prior invention, entitled "Polymer Layer Recovery from a Multi-Layered Chip Material", U.S. Pat. No. 4,629,780, discloses and claims wet chemical processes for separating saran and photographic emulsion layers from polyester and polyvinylchloride layers in photographic and beverage container sheets and films. The wet process has some advantages, including recovery of silver as disclosed in my prior U.S. Pat. entitled "Filter Process for Silver Recovery from Polymeric Films", U.S. Pat. No. 4,765,835. Polycarbonate bottles particularly require recycling to make such use of the expensive plastic economically feasible.

Dry processes for recycling raw materials from plastic films are known in my invention in "A Dry Process for Polymer Recovery", U.S. application Ser. No. 020,470, filed Mar. 2, 1987. Chopping of photographic film and bottles into chip size materials to afford easier handling and to enable separation of metal caps, paper label-bearing portions, and polyethylene bottoms is known. My U.S. Pat. No. 4,775,697 provides a dry abrasive process usable in abrading of chips of a multi-layered film to remove coating layers to recover pure polymer. However, chips may have up to 20% liquid (water, sodium hypochlorite, etc.) on them from silver-removal and other processes. In unrelated arts, ball or rolling mills are used to abrade and polish decorative stones. Rotating mills are used for mixing components such as in fertilizer, and for coating aggregate with asphalt for paving operations. Such ball or rolling mill and other rotating processes have not, to my knowledge, ever been used by others to abrade plastic for recycling.

In summary the present invention comprises a hot abrasive method of drying and then separating and isolating a substantially pure polymer such as a polyester or polycarbonate from a wetted, multi-layer film or sheet having a body of pure polymer in one layer and having one or more other substances such as saran or cellulose triacetate in one or more other, thin, coating layers. Photographic film and plastic drink and beverage containers are primary examples of such films and sheets. The method comprises a first step of placing one volume of chips of the film or sheet in a rotating mill, pug mill, or the like together with about three volumes of small, hard, abrasive particles such as quartz, quartzite rock, glass cullet, or igneous rock of about one sixty-fourth to one-half inch size. The aggregate has been heated to 165° F. to 300° F.

The mill is rotated to mix the hot aggregate with the chips, to dry the chips and to collide and abrade the surfaces of the chips with the abrasive particles, for a selected time in a batch process or for a selected dwell time in a continuous process. The time is generally less than five minutes but is experimentally determined; it varies with the wetness of the chips (up to 20%), the nature of the coating of the polymer, the particular aggregate particles used, and with other factors such as the size of the mill, the fill ratio, the dryness of the chips and aggregate materials used. A second rotating mill, pug mill, or the like can be used in line with the first, with about two volumes of additional hot aggregate added to maintain the temperature needed for complete drying and separation; this second milling is not always needed.

Successful treatment and purity of the resulting polymer is readily determined by a melting test. The aggregate particles, the pure sheet or film remnants, and the coating dust are separated from one another by air classifiers, and the materials are then conveyed to collection and reuse locations. Polymer dust may also be recovered by a further separation step.

Figure 2:
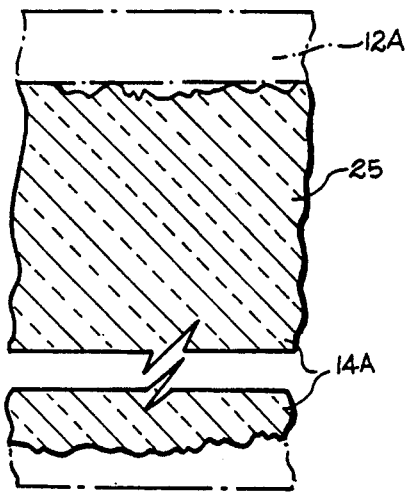
Figure 3:
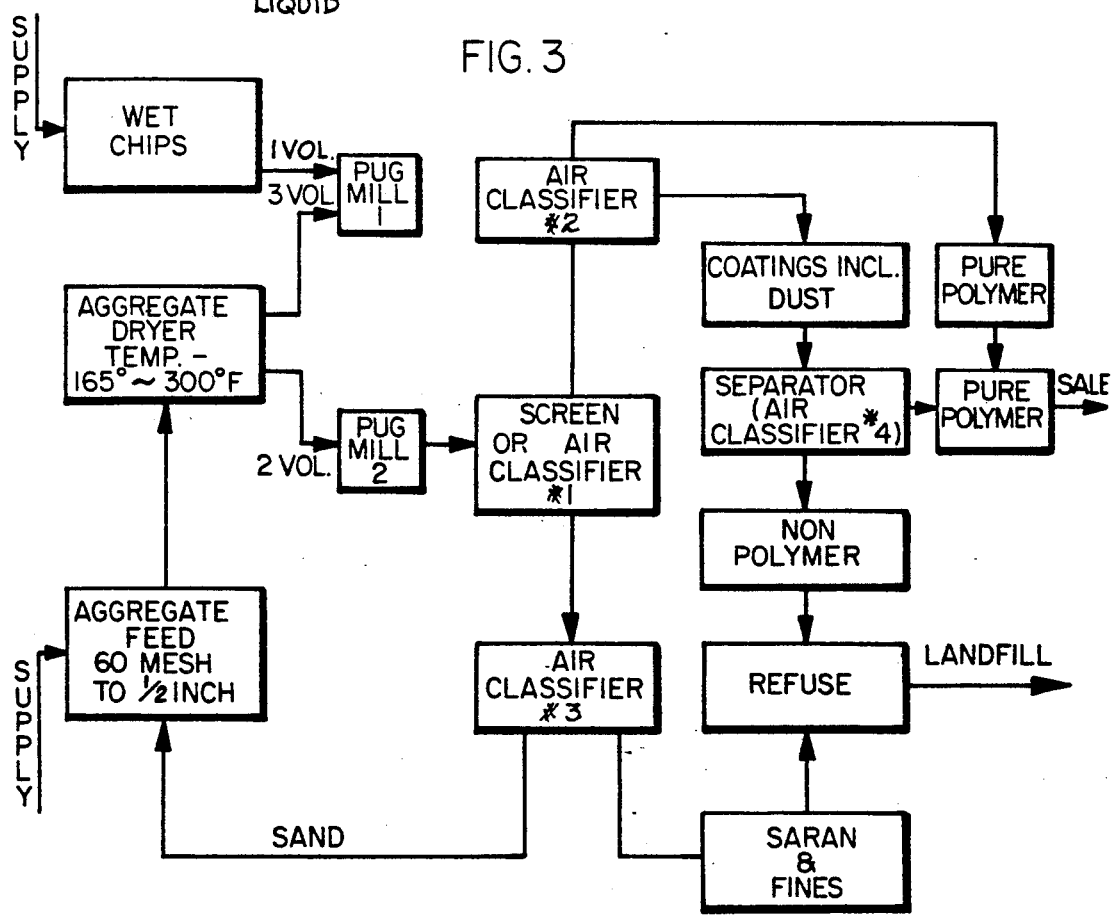

In the drawings, FIG. 1 is a greatly enlarged cross-sectional view, partly in schematic form, of a multi-layer sheet or film at the beginning of a recycling process according to the present invention;

FIG. 2 is a greatly enlarged cross-sectional view of the pure polymer remnant or portion of a multi-layer sheet or film after recycling according to the process of the present invention; and FIG. 3 is a block diagram of the process steps of the present invention in one form.

A portion of a multi-layer plastic film or sheet is shown in greatly enlarged cross section at 10 in FIG. 1. The sheet or film 10 comprises a thin coating layer 12 and a thicker body layer 14 in the form shown; other plastic sheets having additional coating layers besides 12 may also be separated in accordance with the present invention, as hereafter described. The layer 12 is typically sputter-coated or laminated to the thicker layer 14 in order to give the plastic film or sheet 10 desired handling characteristics, impermeability to pressurized gases, or the like.

In photographic film, the layer 12 has a thickness T1 which is about a half percent of the total thickness T2 of the film 10. In beverage container films, the dimension T1 may be an even smaller percentage of the overall thickness T2 or of the thickness T3 of the polymer layer alone.

In other laminate materials, the coating layer 12 is a soft metal film such as aluminum or tin.

A junction 16 between the layers 12 and 14 is shown as a clear demarcation, but in actuality the junction may be somewhat blurred by the surface characteristics of the two substances and their method of joining or lamination. The principles of the invention will generally apply despite fuzziness or irregularities in the junction 16.

Whereas in my prior, patented processes the layers 12 and 14 are separated at the boundary 16 by chemical or totally dry abrasive action, my present invention provides a method of separating substantially all the pure material of layer 14 from the material of layer 12 even if the material is initially wet with up to 20% moisture content by weight. Thus no time- and space-consuming pre-drying step is needed.

As shown in FIGS. 1 and 2, in accordance with my invention, plastic film chips 10 are collided with and heated by hot aggregate particles in a rolling mill. Liquid on the surfaces of the chips 10 is driven off by evaporation and by transfer to the aggregate particles. The aggregate particles are pre-heated as shown in FIG. 3, by any convenient flame, electric, or other heating process.

In addition to the drying of the film chips of residual liquid, the hot aggregate also somewhat softens the coating particles for their easier abrasion from the film chips 10 by collision contacts with the same particles of aggregate 20 as they tumble and collide with the film or sheet chips or pieces 10 in the first mill.

Any hard, abrasive, non-fracturing, and tough aggregate can be used for the particles 20, preferable in a mix of pieces of approximately 1/64th inch to ½ inch maximum dimension. Densely grated aggregate such as quartzite and igneous rock, glass cullet, and the like can be used. Silica materials typically have a hardness of about 7, while saran and cellulose triacetate coatings have hardnesses of about 2. The thin coating of saran, metal, and like materials therefore will quickly dry and also abrade from the polyester or polycarbonate film substrate, after the two to five minutes, resulting in a remnant 25 like that of FIG. 2, plus the aggregate and the dust of the coating polymer or other material. However, the polymer remnant of layer 14 will be pure polymer between the abraded surfaces at the top and bottom of FIG. 2. The coating 12A and upper and lower portions 14A of the polymer layer 14 will have been abraded away as fine dust.

Any appropriate rotary mill, pug mill, or the like, either a batch process or a continuous process, can be used to tumble and heat and abrade the chips 10 and the aggregate 20. A rotary cylinder with internal lifters which is five feet long and about two feet high rotated on its long axis and tilted slightly downwardly to provide a dwell time of about five minutes within the chamber would work adequately. A rotary drum-like mill such as a mobile cement truck could, in a batch process, abrade the coating from ten tons of plastic chips per hour, with a five minute abrasion time for each load. A pug mill such as used for coating aggregate with asphalt could be employed with some reduction of dwell time.

In accordance with the principles of the present invention, the chips and hot aggregate are mixed in a ratio of about one volume of chips to about three volumes of aggregate in the first rotary or pug mill, and about two more volumes are added in the second mill. In each case, the success of the process in drying and then removing the coating layer from the polymer is easily measured by a melting test. A small sample of chip remnants is removed from the second mill and melted in a pan over a gas flame. Any saran or like material remaining on a chip remnant will leave a deep brown or similar speck, readily visible to an observer. If specks appear, more tumbling and abrasion time, a higher ratio of aggregate to chips, or a lower fill in the mill to increase the tumbling action may be accomplished.

The abraded sheet or film remnants, aggregate, and coating dust emerging from the second rotary mill are separated by any known separation system shown at #1, such as an air classifier, if the particles are large (over ¼ inch), or a 30-mesh screen if smaller. At the first separation station as shown in FIG. 3, the heavy aggregate particles are washed in streams of air and dust is removed from their surfaces. At the same time the dust and sheet or film remnants are floated through the classifier #1 and into a second classification station, #2. The aggregate is returned via a further washing/dust removal station #3 to the in-feed station or hopper for storage and/or reheating and reuse.

The separator #2 divides the chips from the dust and abraded chips are sent to a final separator #4, such as another air classifier. Appropriate screens are used at separator #4 to ensure that small chip remnants are not lost into the dust. There the chips are washed in streams of air to remove dust particles from their surfaces, and the dust is floated from and separated from the remnant sheet or film. The dust and the polymer remnants are separately removed from the classifier #4 as shown.

The pure, dried polymer chips are immediately available for use or sale. Where the abrasion process has been used on a particularly valuable material such as polycarbonate, or where much polymer has been removed as a safety factor, an appropriate electrostatic separator can be employed to separate the pure polymer from the coating layer dust before sending waste to an incinerator or landfill.

The full process of the invention is depicted schematically in FIG. 3. From a supply source, plastic film, sheet, or chips thereof are fed into a first rotary mill, pug mill, or the like together with three volumes of hard, non-fracturing aggregate such as quartzite or glass cullet, heated to 165° F. to 300° F. and of 1/64 inch to ¼ inch size. The film or sheet or chips and the aggregate are processed through the first mill until the chips, etc., are dry and the plastic surfaces are abraded beyond the coating layer. This condition is established by testing of samples, but should take 2 to 5 minutes in the first mill and up to 5 more minutes, at continued high temperature, in the second mill with fresh, hot aggregate.

Next, the aggregate is removed from the sheet or film remnants and the dust by an appropriate separator #1, and is returned via a further wash separator #2 to the aggregate storage. The dust and film or sheet remnants are further separated from one another, as in a further air classifier #3. The pure, dry polymer is available for reuse immediately in dry chip form or formed into pellets. The coating dust can be used as is, or can be separated as in a further separator #4 further to recover valuable or excess polymer dust.

As is evident from the foregoing specification, the invention is adaptable to many different processes and is very broad in its conception and implementation. My invention is limited solely by the claims appended hereto, and equivalents thereof.

I claim as my invention:

1. A method of separating and isolating a substantially pure polymer selected from the group consisting of polyester, polycarbonate, a polymer which is similar in abrasion susceptibility to said polyester, and polycarbonate from a wet, multiple layer thereof and having a vinyl chloridevinylidene chloride copolymer or one or more other substances similarly susceptible to abrasion in one or more coating layers on one or more surfaces of said layer of polymer, the method comprising the steps of:

dividing the sheet or film into chips;
heating a supply of aggregate, comprising head, abrasive particles selected from the group consisting of quartz, quartzite rock, glass cullet, igneous rock and any mixture thereof and of a maximum size range from about 1/64 to about ¼ inch, to about 165° F. to 300° F.;
measuring about one volume of said chips and about three volumes of said aggregate;
mixing the chips and hot aggregate together continuously to cause them to collide, to dry the chips of moisture, and to rub the surfaces of the chips and the particles together for a time at least sufficient to abrade substantially all the coating layers from said chips and into dust; and separating the remnants of the chips from the particles and from the dust and collecting the dust and chips separately.

2. A method as defined in claim 1, further comprising the step of measuring about two more volumes of hot aggregate to the chips and aggregate and continuing to mix them to heat the chips and dry them and to abrade the coating layers from said chips.

* * * * *

UNITED STATES PATENT AND TRADEMARK OFFICE
CERTIFICATE OF CORRECTION

PATENT NO. : 5,162,383
DATED : November 10, 1992
INVENTOR(S) : James D. Schoenhard It is certified that error appears in the above-indentified patent and that said Letters Patent is hereby corrected as shown below:

Column 4, Claim 1, line 58, delete "head" and substitute therefor --hard--.

Signed and Sealed this

Nineteenth Day of April, 1994

Attest:

BRUCE LEHMAN

*Attesting Officer*          *Commissioner of Patents and Trademarks*